UNITED STATES PATENT OFFICE.

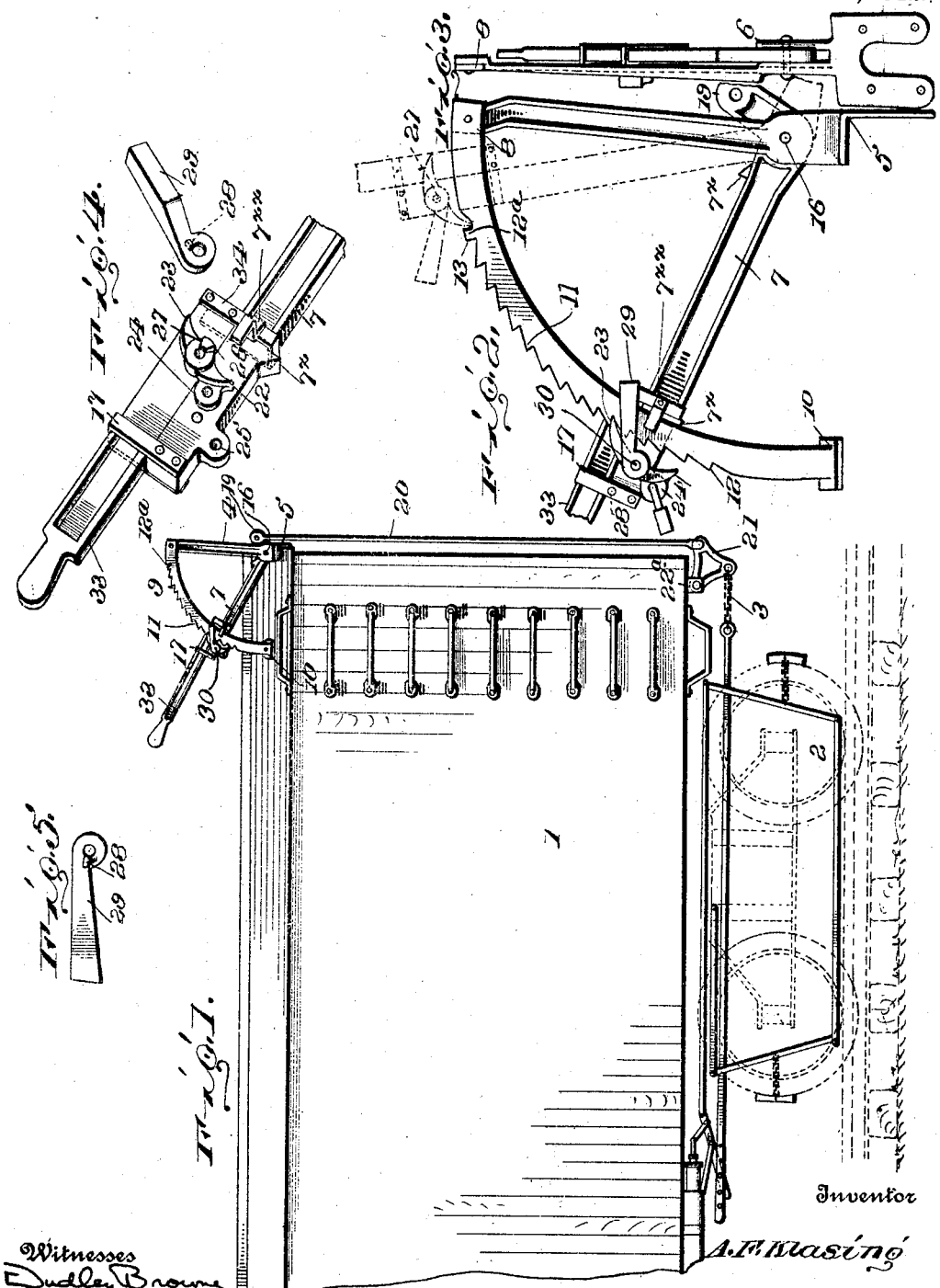

AUGUSTUS FREDERICK KLASING, OF SAN ANTONIO, TEXAS.

CAR-BRAKE.

1,016,332.  Specification of Letters Patent.  Patented Feb. 6, 1912.

Application filed July 14, 1911. Serial No. 638,546.

*To all whom it may concern:*

Be it known that I, AUGUSTUS FREDERICK KLASING, a citizen of the United States, residing at San Antonio, in the county of Bexar and State of Texas, have invented certain new and useful Improvements in Car-Brakes, of which the following is a specification.

This invention relates to improvements in railroad brake operating mechanism.

The object of the invention is to provide convenient and simple means for manually operating the brakes on cars and to provide an economical construction.

In my patent dated December 6, 1910, No. 977,634, I illustrated and described a construction embodying several of the characteristics of my present invention, but experience and practical use has demonstrated that minor changes are desirable to render the mechanism more efficient. To this end this application covers specific improvements in the structural details, and arrangement of parts which will be hereinafter described, and particularly pointed out in the claims.

In the accompanying drawings: Figure 1 is a side elevation of a freight car, and brake mechanism with my present improvements applied thereto. Fig. 2 is an enlarged side elevation of the brake operating mechanism. Fig. 3 is an elevation of the same taken at right angles to Fig. 2. Fig. 4 is a detail perspective view of my improved collapsible handle and the pawl and latch carried thereby, the parts being separated. Fig. 5 is a detail view of the latch.

1 indicates a car, and 2, brake mechanism including a connecting rod 3, similar to that shown and described in the before mentioned patent.

As the present invention relates primarily to improvements in the brake operating mechanism, it is not deemed necessary, especially in view of the patent referred to, to describe in detail the brakes, etc.

Mounted on the car is a standard 4, provided at its lower end with an angular bracket 5, the horizontal flange of which rests on the top of the car, while the vertical flange bears on the end surface of said car. Above the bracket extends a short lug 6, spaced somewhat from the standard 4, and forms with the latter bearings for an operating lever 7. The upper end of the standard 4, is formed with an offset to provide a seat 8, for a segmental bar 9, bolted or otherwise fastened in position and provided at its lower end with flanges 10, for convenient attachment to the top of the car. The outer edge of the segmental bar is formed with ratchet teeth 11, the shoulders 12, of which face rearwardly or downwardly from the end of the car. At the upper terminal of the ratchet teeth 11, is a tooth $12^a$, the shoulder 13 of which faces opposite to the shoulders 12, for a purpose to be described.

The operating lever 7, is pivoted at 16, between the standard 4, and the lug 6, and extends beyond the segmental bar 9, and is provided with a bail 17, while the inner end of the said lever is arranged substantially at right angle to the main portion, as shown at 19. To the angular end 19, is pivoted a link 20, which in the instance shown in the drawing extends down to a point below the bottom of the car 1, and is pivoted to a bell crank lever 21, which is pivoted to the car at $22^a$. To the opposite end of the bell crank lever is pivoted the connecting rod 3, to couple the connection to the brake mechanism.

Pivoted to the operating lever beyond the plane of the ratchet teeth 11, is a double pawl, provided with opposite operative ends 22 and 23, designed to coöperate with the teeth 11 and $12^a$. Extending from the pawl, adjacent the operative end 22, is a perforated ear 24, which when the brakes are set, registers with a perforated ear 25, extending from the operating lever 7. From the hub of the double pawl projects a lug having two radial surfaces 26 and 27, with which coöperates a radial lug 28, on a weighted lever 29, pivotally mounted on the pivot 30, which also supports said pawl. The weighted lever is intended to be manually turned on its pivot to bring the lug 28, into contact with either surface 26 or 27, to rock the pawl to engage the respective ratchet teeth.

Extending through the bail 17 is an extensible operating lever 33, fitting snugly against the upper edge of the operating lever 7 and provided at its inner end with a bail 34, through which the operating lever 7 passes. The two bails 17 and 37, afford a convenient means for holding the two levers 7 and 33 in proper relation, and at the same time prevent them from becoming disengaged from each other.

In operation, assuming the parts are positioned as shown in dotted lines to the right of Fig. 2, and it is desired to set the brakes, the brakeman rocks the weighted lever toward the right which causes the lug 28 to strike the surface 27 on the pawl and thereby disengages the operative surface 22, of said pawl from the shoulder 13 of the tooth 12ª. The extensible lever 33, is drawn outwardly to increase the leverage of the operating lever, and then said lever is rocked downwardly as shown in full lines in Fig. 2. Obviously with the weight of the lever 29 bearing on the lug of the pawl the operative surface 23 of the pawl will be in constant engagement with the ratchet teeth 11, and with the catch behind the shoulders thereof and hold the lever in locked position. The brake having been set, the extensible lever 33, is pushed down and out of the way, on the lever 7. Now if it be desired to lock the car in braked position, the two ears 24 and 25, are in registry, and a lock may be passed through the perforations therein, as shown in Fig. 2. This will prevent unauthorized or maliciously inclined persons starting the car. To release the brakes, the weighted lever 29, is rocked on its pivot, to cause the lug 28, to contact with the inclined surface 26, of the pawl and with slight downward pressure on the operating lever the operative end 23, will be disengaged with the ratchet tooth, and the operative end 22, will ride freely over said ratchet teeth. Now upon the raising of the operating lever, the operative end 22, of the pawl will catch behind the shoulder 13, as shown in dotted lines in Fig. 2, and automatically lock the brakes in open position. The operating lever 7, is provided near its upper and lower ends with lugs 7ˣ, to limit the movement of the extensible lever 33. When the lever 33, is in extended position, the bail 34, contacts with the upper lug 7ˣ, and when lowered, the end of said lever 33, abuts against the lower lug 7ˣ. A guide strip 7ˣˣ, is attached to the bail 34, and fits against one side of the segmental bar 9, to prevent the lever 7, swinging laterally.

Obviously, when fitting my improvement to different forms of cars, slight changes must be made in the fastening means. These changes, however, would not be such as would depart from the spirit and scope of the invention.

The invention is extremely simple in construction and as the parts are few in number, it is evident I have provided an economical construction, and that the various elements are not liable to become out of order

What I claim is:

1. In a brake operating mechanism, the combination of a segment provided with oppositely disposed ratchet teeth, a pivoted operating lever, a pawl provided with opposite operative ends, pivoted to the operating lever and, a loosely pivoted weight to set the pawl to cause one or the other of its operative ends to engage with one of the respective oppositely disposed teeth.

2. In a brake operating mechanism, the combination of a segment provided with oppositely disposed teeth, a pivoted operating lever, a pawl having opposite operative ends and pivoted to the operating lever, a lug on said pawl, a weighted lever having a lug to coöperate with the lug on the pawl to set the operative end in position to engage the teeth, a perforated ear on the pawl, and a perforated ear on the operating handle, said ears being positioned to register when the pawl is set to hold the brakes of a car, whereby a lock may be employed to lock the pawl and the operating lever.

3. In a brake operating mechanism, the combination of a segment provided with a series of ratchet teeth, a tooth oppositely disposed to the series of ratchet teeth, a pivoted operating lever, a pawl pivoted to the operating lever and provided with opposite operative ends to coöperate with the teeth, a lug on the pawl, a pivoted weighted lever having a lug to coöperate with the lug on the pawl to set the operative ends thereof with reference to the teeth, whereby when the weighted lever is in one position one operative end of the pawl will engage one of the series of ratchet teeth to hold the brakes of a car in set position, and whereby when said weighted lever is thrown in the opposite direction the opposite operative end of said pawl will be in position to engage the oppositely disposed tooth on the segment.

4. In a brake mechanism, the combination of a segmental bar provided with oppositely disposed teeth, a pivoted operating lever formed with a perforated ear beyond the plane of the teeth, a pawl pivoted to the operating lever and having oppositely disposed operative ends, an ear formed on the pawl and adapted to register with the ear on the operating handle when the pawl is set to lock the brakes, a lug formed on the pawl, a weighted lever formed with a lug to coöperate with the lug on the pawl to set the operative ends of the latter to coöperate with the teeth, a bail on the operative handle, an extension handle passing through the bail, and a bail on the extension handle which embraces the operative handle.

5. In a brake operating mechanism, the combination of a standard provided with a bracket at its lower end and a perforated lug above the bracket, said lug being spaced from the standard, a segmental bar projecting from the upper end of the standard and provided with oppositely disposed teeth on its edge, flanges at the end of the segmental bar, an angular lever pivoted in the space formed between the standard and the lug, a pawl pivoted to the operating lever, said pawl having oppositely disposed operative ends to coöperate with the oppositely disposed teeth, a lug on the pawl, a weighted lever having a lug which coöperates with the lug on the pawl to rock the latter, a bail on the angular lever, an extension lever fitting in the bail, and a bail on the extension lever through which the angular lever passes.

6. In a brake operating mechanism, the combination of a segment provided with oppositely disposed ratchet teeth, a pivoted operating lever, a pawl provided with opposite operative ends pivoted to the operating lever, and means to set the pawl to cause one or the other of its operative ends to engage with one of the respective oppositely disposed teeth.

7. In a brake operating mechanism, the combination of a segment provided with oppositely disposed ratchet teeth, a lever comprising a pivoted member and a sliding member, means for limiting the sliding movement of the sliding member, a pawl provided with opposite operative ends pivoted to the pivoted member of the lever, and means to set the pawl to cause one or the other of its operative ends to engage with one of the respective oppositely disposed teeth.

8. In a brake operating mechanism, the combination of a segment provided with teeth, a pivoted operating lever, a pawl provided with opposite operative ends and pivoted to the operating lever, means coöperating with the pawl to cause the operative end of the pawl to engage the teeth, and means between the pawl and operating lever to lock the same together to hold the brakes applied to a car.

9. In a brake operating mechanism, the combination with a standard, a toothed segment mounted on said standard, an operating lever comprising a lower forward member pivoted at its front end to said standard, an upper member slidably secured to said lower member, and a pawl carried by said lower member and adapted to engage the teeth of the segment, and means between the pawl and operating lever to lock the same together to hold the brakes applied to a car.

In testimony whereof I affix my signature in presence of two witnesses.

AUGUSTUS FREDERICK KLASING.

Witnesses:
S. E. BUINK,
W. T. SWANSON.